Patented May 27, 1930

1,760,137

UNITED STATES PATENT OFFICE

HENRY HOWARD, OF CLEVELAND, OHIO, ASSIGNOR, BY MESNE ASSIGNMENTS, TO THE GRASSELLI CHEMICAL COMPANY OF CLEVELAND, OHIO, A CORPORATION OF DELAWARE

PROCESS FOR THE PRODUCTION OF SODIUM THIOSULPHATE

No Drawing. Application filed December 5, 1925. Serial No. 73,483.

This invention relates to a process for the production of sodium thiosulphate from sodium sulfid and sulfur dioxid.

A method quite commonly employed for working up waste sodium sulfid solutions and producing sodium thiosulphate is to contact a solution of sodium sulfid with sulfur dioxid containing gases such as burner gases in a suitable reaction tower. This method has a number of disadvantages among which may be mentioned the liberation of elemental sulfur, the liberation and loss of hydrogen sulfid, the use of expensive and cumbersome reaction towers, and the inefficiency of the method with respect to the yield of thiosulphate.

By way of explanation it is noted that the reactions involved in the formation of sodium thiosulphate from sodium sulfid and sulfur dioxid probably are as follows:

(1) $2Na_2S + 2SO_2 + 2H_2O = 2Na_2SO_3 + 2H_2S$
(2) $2H_2S + SO_2 = 2H_2O + 3S$
(3) $2Na_2SO_3 + 2S = 2Na_2S_2O_3$ a summary of the reactions being:

$$2Na_2S + 3SO_2 = 2Na_2S_2O_3 + S$$

An object of the present invention is to provide a process in which sodium sulfid, in the form for instance of waste sodium sulfid liquors, and sulfur dioxid, in the form for instance of burner gases, may be used and which can be carried out efficiently in simple apparatus without the liberation of elemental sulfur or loss of hydrogen sulfid.

The process of my invention consists essentially in supplying sodium sulfid solution and sulfur dioxid to a reaction mixture containing sodium sulfite at such relative rates that the sulfur dioxid content of the reaction mixture is maintained slightly in excess.

Atomic or nascent sulfur combines rapidly with sodium sulfite at temperatures above 60° C. and more slowly at lower temperatures, forming sodium thiosulphate, and consequently it is a simple matter to take care of the elemental sulfur liberated by the foregoing reactions by supplying the reaction mixture with sufficient sodium sulfite to combine with it and preferably maintaining the temperature of the reaction mixture at or above 60° C.

The liberation of hydrogen sulfid is avoided in my process by maintaining a slight excess of sulfur dioxid in the reaction mixture so that the hydrogen sulfid theoretically liberated by the reaction of sulfur dioxid with the sodium sulfid is immediately attacked by the free sulfur dioxid in the reaction mixture forming elemental sulfur—see reaction "(2)" above—which in turn reacts with the sodium sulfite forming thiosulphate.

The reactions involved in the process of my invention are represented by the equation:

$$2Na_2S + 3SO_2 + Na_2SO_3 = 3Na_2S_2O_3$$

The process is suitably carried out in a simple reaction vessel or tank by first introducing into the tank a suitable batch of a solution of sodium sulfite and then introducing into this solution sodium sulfid and sulfur dioxid at such relative rates that the sulfur dioxid content of the reaction mixture is maintained in slight excess until the proportion of the reagents indicated by the foregoing formula has been provided. The sodium thiosulphate in the resulting reaction mixture is then recovered in the usual way.

There are, of course, numerous possible variations of the procedure described in which the characteristic features of my invention may be employed. Some of such variations are as follows—it being understood that no attempt is made to describe every possible procedure falling within the scope of my invention.

In the first place, it is noted that the invention is not limited to the carrying out of the process in a simple tank or vessel. Any suitable form of apparatus for bringing the reagents into reaction relation, including a gas and a liquid contact tower, may be used, although a simple apparatus such as a tank will serve the purpose and therefore is preferred. The sulfur dioxid may be supplied in the form of an aqueous solution of any desired concentration or in the form of a gas of any desired concentration, but for commercial operation, ordinary burner gases as rich as possible in sulfur dioxid are preferred; 16 per cent of $SO_2$ is not difficult to obtain in practice. Concentration of the sodium sulfid solution may vary. Weak sodium sulfid liquors containing 25 per cent of $Na_2S.9H_2O$ and about 5 per cent of $Na_2CO_3$ produced in the manufacture of sodium sulfid are entirely suitable, and the process is well suited for the treatment of such liquors. In this connection it is noted that the sodium sulfid liquor referred to contains sodium carbonate. Since this sodium carbonate is converted to sodium sulfite by reaction with sulfur dioxid, and the sodium sulfite so formed is converted to thiosulphate as explained above the sodium carbonate content of the sodium sulfid liquor must be taken into consideration in calculating the quantity of sodium sulfite and sulfur dioxid required for the reaction. In fact sodium carbonate may entirely replace sodium sulfite as is indicated by the following equation:

$$2Na_2S + Na_2CO_3 + 4SO_2 = 3Na_2S_2O_3 + CO_2$$

The sodium sulfid may be replaced wholly or in part by the polysulfids of sodium such as the di or the penta sulfid, it being only necessary to provide a sufficient additional supply of sodium sulfite to combine with the additional sulfur involved in the reaction. The use of sodium disulfid is illustrated by the following equation:

$$2Na_2S_2 + 3Na_2SO_3 + 3SO_2 = 5Na_2S_2O_3$$

It is not necessary to proceed as described above by introducing the sulfur dioxid and the sodium sulfid liquor into a sodium sulfite solution. The essential features which must be observed are that there shall be a reaction mixture containing a slight excess of sulfur dioxid into which sodium sulfid and sulfur dioxid are introduced at such relative rates as to maintain this condition, and the reaction mixture must contain sodium sulfite either present as such or formed for instance by reaction of sodium carbonate with the sulfur dioxid in quantity sufficient to combine with sulfur as fast as it is liberated by the reaction of the sulfur dioxid and the sodium sulfid. One might start the process by using water or a mother liquor as the neutral reaction medium and introducing the sulfur dioxid, the sodium sulfid and the sodium sulfite into it at such relative rates as to maintain the specified conditions, or the sodium sulfite solution might be combined with the sodium sulfid solution or with a solution of the sulfur dioxid prior to the mixing of the sodium sulfid and the sulfur dioxid. This leads to another possible modification of the process, i. e., the use of sodium acid sulfite, $NaHSO_3$, to replace a portion of the sulfur dioxid and sodium sulfite required by the reaction. In this case, the supply of sodium acid sulfite to the reaction mixture would have to be regulated with respect to the same considerations involved in the introduction of sulfur dioxid.

The numerous possible variations of the process described above are intended to indicate the scope of the invention defined in the appended claims.

It is impossible to define numerically the excess of sulfur dioxid required and permissible in the reaction mixture, since it may vary with the temperature of the reaction mixture, concentration and other conditions such as the efficiency of the contact of the reacting materials. As stated the temperature of the reaction mixture should preferably be maintained above 60° C. and the reaction mixture should be agitated in some suitable way to promote the mixing of the reagents. The limits upon the excess sulfur dioxid content of the reaction mixture may be determined by simple observation. If the excess of sulfur dioxid becomes too small hydrogen sulfid will be liberated and can be detected by its odor, whereas if the sulfur dioxid excess becomes too great, elemental sulfur will be liberated in the reaction mixture producing a milky appearance.

I claim:

1. Process for the production of sodium thiosulphate which comprises reacting upon sodium sulfid with sulfur dioxid supplied in the form of burner gases in the presence of sodium sulfite in a reaction mixture containing sulfur dioxid slightly in excess of the requirements of the reaction:

$$2Na_2S + 3SO_2 = 2Na_2S_2O_3 + S$$

and sodium sulfite sufficient to meet the requirements of the reaction:

$$S + Na_2SO_3 = Na_2S_2O_3.$$

2. Process for the production of sodium thiosulphate which comprises introducing sulfur dioxid containing burner gases and a solution containing sodium sulfid into an aqueous reaction mixture containing sodium sulfite at such corresponding rates that neither hydrogen sulfid nor elemental sulfur is liberated in appreciable amounts.

3. Process for the production of sodium thiosulphate which comprises introducing sulfur dioxid containing burner gases and a solution containing sodium sulfid into an aqueous reaction mixture containing sodium sulfite maintained at a temperature of at least 60° C. at such corresponding rates that neither hydrogen sulfid nor elemental sulfur is liberated in appreciable amounts.

In testimony whereof, I affix my signature.

HENRY HOWARD.